United States Patent
Piao et al.

(10) Patent No.: US 11,881,584 B2
(45) Date of Patent: Jan. 23, 2024

(54) NEGATIVE ELECTRODE ACTIVE MATERIAL, PREPARATION METHOD THEREOF, NEGATIVE ELECTRODE AND SECONDARY BATTERY BOTH INCLUDING SAME

(71) Applicant: LG ENERGY SOLUTION, LTD., Seoul (KR)

(72) Inventors: Li Lin Piao, Daejeon (KR); Je Young Kim, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 496 days.

(21) Appl. No.: 17/293,950

(22) PCT Filed: Apr. 2, 2020

(86) PCT No.: PCT/KR2020/004521
§ 371 (c)(1),
(2) Date: May 14, 2021

(87) PCT Pub. No.: WO2020/204631
PCT Pub. Date: Oct. 8, 2020

(65) Prior Publication Data
US 2022/0006087 A1 Jan. 6, 2022

(30) Foreign Application Priority Data
Apr. 2, 2019 (KR) .................. 10-2019-0038618

(51) Int. Cl.
| | |
|---|---|
| *H01M 4/00* | (2006.01) |
| *H01M 4/587* | (2010.01) |
| *C01B 32/21* | (2017.01) |
| *H01M 4/133* | (2010.01) |
| *H01M 10/0525* | (2010.01) |
| *H01M 4/02* | (2006.01) |

(52) U.S. Cl.
CPC ............. *H01M 4/587* (2013.01); *C01B 32/21* (2017.08); *H01M 4/133* (2013.01); *H01M 10/0525* (2013.01); *C01P 2004/32* (2013.01); *C01P 2004/61* (2013.01); *C01P 2004/84* (2013.01); *C01P 2006/12* (2013.01); *C01P 2006/40* (2013.01); *H01M 2004/027* (2013.01)

(58) Field of Classification Search
CPC ...... H01M 4/043; H01M 4/587; H01M 4/133; H01M 4/625; H01M 4/1393; Y02E 60/10; C01P 2004/60; C01P 2006/40; C01P 2004/84; C01P 2004/32
See application file for complete search history.

(56) References Cited

U.S. PATENT DOCUMENTS

| | | | |
|---|---|---|---|
| 2004/0023115 A1* | 2/2004 | Kato | .................. H01M 50/124 429/217 |
| 2008/0199777 A1 | 8/2008 | Onishi et al. | |
| 2008/0274406 A1 | 11/2008 | Fuse et al. | |
| 2009/0214954 A1 | 8/2009 | Onishi et al. | |
| 2014/0356707 A1 | 12/2014 | Kwon et al. | |
| 2015/0004488 A1* | 1/2015 | Abdelsalam | .......... H01M 4/587 252/502 |
| 2015/0155557 A1 | 6/2015 | Kwon et al. | |
| 2015/0251911 A1 | 9/2015 | Yamamoto et al. | |
| 2017/0133680 A1 | 5/2017 | Cheng et al. | |
| 2018/0183060 A1 | 6/2018 | Spahr et al. | |
| 2020/0227747 A1 | 7/2020 | Spahr et al. | |

FOREIGN PATENT DOCUMENTS

| | | |
|---|---|---|
| EP | 2 913 873 A1 | 9/2015 |
| EP | 3 136 461 A1 | 3/2017 |
| JP | 2983003 B2 | 11/1999 |
| JP | 2006-49288 A | 2/2006 |
| JP | 4403327 B2 | 1/2010 |
| JP | 2014-208582 A | 11/2014 |
| JP | 6274390 B2 | 2/2018 |
| KR | 10-2004-0012541 A | 2/2004 |
| KR | 10-2007-0065875 A | 6/2007 |
| KR | 10-1106966 B1 | 1/2012 |
| KR | 10-2014-0132791 A | 11/2014 |
| KR | 10-2014-0140952 A | 12/2014 |
| KR | 10-2015-0065041 A | 6/2015 |
| KR | 10-1698745 B1 | 1/2017 |
| KR | 10-2018-0070507 A | 6/2018 |
| WO | WO-2017125592 A1 * | 7/2017 ........... C01B 32/205 |

OTHER PUBLICATIONS

Gulas et al., Carbonaceous Materials and Methods of Use Thereof, Jul. 2017, See the Abstract. (Year: 2017).*
International Search Report issued in PCT/KR2020/004521 (PCT/ISA/210), dated Jul. 8, 2020.
Extended European Search Report for European Application No. 20783661.0, dated Jan. 4, 2022.

* cited by examiner

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

A negative electrode active material including natural graphite, wherein a $D_{90}/D_{10}$, which is the ratio of $D_{90}$ to $D_{10}$, is 2.20 or less, a $D_{50}$ is 6 μm to 11 μm, and a BET specific surface area is 2.2 m²/g or less.

13 Claims, No Drawings

NEGATIVE ELECTRODE ACTIVE MATERIAL, PREPARATION METHOD THEREOF, NEGATIVE ELECTRODE AND SECONDARY BATTERY BOTH INCLUDING SAME

TECHNICAL FIELD

Cross-Reference to Related Applications

This application claims the benefit of Korean Patent Application No. 10-2019-0038618, filed on Apr. 2, 2019, in the Korean Intellectual Property Office, the disclosure of which is incorporated herein in its entirety by reference.

TECHNICAL FIELD

The present invention relates to a negative electrode active material, and a method for preparing the same, a negative electrode and a lithium secondary battery including the same.

BACKGROUND ART

As the price of energy sources has increased due to the depletion of fossil fuels, and the interest in environmental pollution is amplified, eco-friendly alternative energy sources have become an indispensable factor for future life.

Particularly, as the technology development and demand for mobile devices have increased, the demand for secondary batteries as an eco-friendly energy source has been rapidly increased.

Typically, the secondary battery has used a lithium metal as a negative electrode of a secondary battery. However, since a risk of battery short circuit due to the formation of dendrite and battery explosion caused thereby became problematic, the use a carbon-based active material capable of intercalation and de-intercalation of reversible lithium ions and maintaining structural and electrical properties has emerged.

As the carbon-based active material, various types of carbon-based materials, such as artificial graphite, natural graphite, and hard carbon, have been applied. Among these, a graphite-based active material capable of ensuring the lifespan properties of a lithium secondary battery with excellent reversibility has been most widely used. Since the graphite-based active material has a low discharge voltage of −0.2 V compared to lithium, a battery using the graphite-based active material may exhibit a high discharge voltage of 3.6 V, thereby providing a number of advantages in terms of the energy density of a lithium battery.

Among the graphite-based active materials, natural graphite in particular has a higher output and capacity than other carbon-based active materials such as artificial graphite, and has excellent adhesion, and thus, has the advantage of reducing the amount of use of a binder, and implementing a high-capacity, high-density negative electrode. However, when compared to artificial black, the natural graphite has a problem in that the cycle swelling caused by an electrolyte side reaction becomes severe as charging and discharging continues, so that the use thereof may be limited despite the above-mentioned advantages.

In order to prevent the cycle expansion problem of natural graphite, a mixture in which natural graphite and artificial graphite are mixed in a certain ratio may be used as a negative electrode active material, but even in this case, the natural graphite is still poor in preventing cycle expansion caused by charging and discharging compared to artificial graphite. Therefore, it is not possible to sufficiently prevent the thickness expansion when the natural graphite is used in a negative electrode.

Thus, it is necessary to develop a negative electrode active material capable of preventing a cycle expansion problem while promoting the high output and capacity of natural graphite.

Although Japanese Patent Laid-Open Publication No. 4403327 discloses graphite powder for a negative electrode of a lithium-ion secondary battery, the disclosure does not provide an alternative to solve the aforementioned problems.

PRIOR ART DOCUMENT

Patent Document

Japanese Patent Laid-Open Publication No. 4403327

DISCLOSURE OF THE INVENTION

Technical Problem

An aspect of the present invention provides a negative active material including natural graphite, which is capable of exhibiting excellent output and capacity properties of natural graphite while effectively preventing a cycle expansion problem caused by an electrolyte side reaction.

Another aspect of the present invention provides a method for preparing a negative electrode active material, wherein the method includes a process of pressurizing natural graphite by a Cold Isostatic Press method, thereby effectively preventing a cycle expansion problem of natural graphite.

Yet another aspect of the present invention provides a negative electrode and a secondary battery including the above-described negative electrode active material.

Technical Solution

According to an aspect of the present invention, there is provided a negative electrode active material including natural graphite, wherein a $D_{90}/D_{10}$, which is the ratio of $D_{90}$ to $D_{10}$, is 2.20 or less, a $D_{50}$ is 6 μm to 11 μm, and a BET specific surface area is 2.2 m²/g or less.

According to another aspect of the present invention, there is provided a method for preparing a negative electrode active material, the method including the steps of pressurizing natural graphite by a cold isostatic press method, and adjusting the $D_{90}/D_{10}$ of the pressurized natural graphite, which is the ratio of $D_{90}$ to $D_{10}$, to be 2.20 or less and adjusting the $D_{50}$ of the pressurized natural graphite to be 6 μm to 11 μm, wherein the BET specific surface area of the natural graphite having the adjusted $D_{90}/D_{10}$ and $D_{50}$ is 2.2 m2/g or less.

According to another aspect of the present invention, there is provided a negative electrode including a negative electrode current collector and a negative electrode active material layer formed on the negative electrode current collector, wherein the negative electrode active material layer includes the above-described negative electrode active material.

According to another aspect of the present invention, there is provided a secondary battery including the negative electrode described above, a positive electrode opposing the negative electrode, a separator interposed between the negative electrode and the positive electrode, and an electrolyte.

Advantageous Effects

A negative electrode active material of the present invention has the ratio of $D_{10}$ and $D_{90}$, $D_{50}$, and BET specific surface area adjusted to a specific range in a particle diameter distribution, and thus, when applied to a negative electrode, packing among active material particles may be smoothly achieved, and the problem of cycle expansion caused by an electrolyte side reaction and the problem of thickness expansion of a negative electrode active material layer may be effectively prevented. Accordingly, the output and capacity properties of natural graphite may be effectively exhibited, while improving the lifespan properties.

In addition, a method for preparing a negative electrode active material of the present invention pressurizes natural graphite and adjusts the particle size of the active material by applying Cold Isostatic Press (CIP) for the implementation of the above-described negative electrode active material. Therefore, according to the preparation method of the present invention, fine pores present inside natural graphite or a negative electrode active material may be reduced or removed to reduce the specific surface area of the active material, and packing between particles may be facilitated, so that the expansion problem of the active material according to the charging and discharging may be effectively prevented.

MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

In the present specification, $D_{50}$, $D_{10}$, and $D_{90}$ may be defined as a particle diameter respectively corresponding to 50%, 10%, and 90% of the volume accumulation in a particle diameter distribution curve of a particle. The $D_{50}$, $D_{10}$, and $D_{90}$ may be measured by, for example, a laser diffraction method. The laser diffraction method generally enables measurement of a particle diameter from a sub-micron region to several millimeters, so that results of high reproducibility and high resolution may be obtained.

Hereinafter, the present invention will be described in more detail.

<Negative Electrode Active Material>

The present invention relates to a negative electrode active material, and specifically, to a negative electrode active material for a secondary battery, and more specifically, to a negative electrode active material for a lithium secondary battery.

Specifically, the negative electrode active material of the present invention includes natural graphite, wherein a $D_{90}/D_{10}$, which is the ratio of $D_{90}$ to $D_{10}$, is 2.20 or less, a $D_{50}$ is 6 μm to 11 μm, and a BET specific surface area is 2.2 m²/g or less.

The negative electrode active material of the present invention is a negative electrode active material including natural graphite, and the $D_{90}/D_{10}$ is adjusted to be 2.20 or less, $D_{50}$ is adjusted to be 6 μm to 11 μm, and at the same time, the BET specific surface area is adjusted to be 2.2 m²/g or less. The negative electrode active material having the $D_{90}/D_{10}$, $D_{50}$, and BET specific surface area adjusted to be in the above-described ranges is one from which micropores of natural graphite which cause an electrolyte solution side reaction and a cycle expansion problem are sufficiently removed and having a uniform particle size distribution. Thus, when applied to a negative electrode, the packing degree between particles is excellent, and the cycle expansion problem caused by the charge/discharge of the negative electrode and the resulting increase in the thickness of the negative electrode may be effectively prevented.

The negative electrode active material includes natural graphite.

Since the negative electrode active material uses natural graphite, there is an advantage of having high output and capacity when compared to cases using other carbon-based active materials such as artificial graphite. Specifically, the negative electrode active material may include natural graphite having a theoretical capacity of 360 mAh/g or more.

The negative electrode active material may further include a carbon coating layer formed on the natural graphite. The carbon coating layer may be an amorphous carbon coating layer, and specifically, may be formed by providing at least one precursor selected from the group consisting of pitch, rayon and polyacrylonitrile-based resins to the natural graphite and performing heat-treatment to thermally decompose the precursor.

The carbon coating layer may contribute to improving the structural stability of the active material. In addition, the carbon coating layer may reduce fine pores present in natural graphite and reduce the BET specific surface area to a desired level, and thus, may effectively prevent a side reaction with an electrolyte solution.

In terms of preventing a side reaction with an electrolyte solution, sufficiently improving structural stability, and preventing lithium intercalation/de-intercalation inhibition due to excessive formation, the carbon coating layer may be included in a negative electrode active material in an amount of 2 wt % to 7 wt %, preferably 3 wt % to 6 wt %, more preferably 4.5 wt % to 5.5 wt %.

The negative electrode active material may be spherical. In the present specification, "spherical" is a concept that encompasses not only a complete spherical shape, but also a slightly deformed, but substantially spherical form.

When the negative electrode active material is spherical, packing between active material particles may be facilitated, so that the thickness expansion problem of a negative electrode active material caused by charge/discharge may be reduced to an even more excellent level.

The spherical negative electrode active material may be implemented from spherical natural graphite, or a negative electrode active material including the spherical natural graphite and a carbon coating layer formed on the spherical natural graphite.

The $D_{50}$ of the negative electrode active material is 6 μm to 11 μm. When the $D_{50}$ is less than 6 μm, the specific surface area of the active material increases, so that side reactions with an electrolyte solution may increase and the occurrence of cycle swelling may be intensified. When greater than 11 μm, due to the increase in the particle size of the negative electrode active material, volume expansion caused by charge/discharge may be further intensified, and the diffusion distance of lithium becomes long, so that rapid charging performance may be deteriorated.

The $D_{50}$ of the negative electrode active material may be preferably 7.5 μm to 10.5 μm, more preferably 8.5 μm to 9.5 μm. When in the above range, the packing performance of particles is improved and pores between particles are reduced, so that swelling prevention is excellent, and it is also preferred in terms of improving rapid charging performance since lithium may be smoothly intercalated/de-intercalated even at a high C-rate due to the small particle size.

The $D_{90}/D_{10}$ of the negative electrode active material, which is the ratio of $D_{90}$ to $D_{10}$, is 2.20 or less.

By adjusting the $D_{90}/D_{10}$ to the above-described level, the negative electrode active material may have active material particles having a uniform particle size, and accordingly, when the negative electrode active material is applied to a negative electrode, the packing degree of the active material particles may be improved, and the deformation of the particles may be prevented when roll-pressing the negative electrode. Therefore, the mechanical expansion of the negative electrode and/or the cycle expansion caused by an electrolyte solution side reaction may be prevented.

If the $D_{90}/D_{10}$ of the negative electrode active material exceeds 2.20, packing between particles is not facilitated, and since pores between the particles increases, the electrolyte solution side reaction may be intensified and the thickness expansion of the negative electrode caused by charge/discharge may not be effectively prevented. Also, the volume expansion due to the charge/discharge of particles having a relatively large particle size may be partially responsible for intensifying a swelling phenomenon.

The $D_{90}/D_{10}$ of the negative electrode active material may be 2.20 or less, preferably 1.98 or less, more preferably 1.80 to 1.98. When in the above range, the cycle expansion problem caused by an electrolyte solution side reaction may be prevented to an even more excellent level.

In the negative electrode active material, the difference between $D_{90}$ and $D_{10}$ ($D_{90}-D_{10}$) may be 7.5 μm or less, preferably 7.1 μm or less, more preferably 6.5 μm to 7.1 μm. When in the above range, the influence of the volume expansion due to the charge/discharge of particles having a relatively large particle size may be minimized, so the occurrence of swelling may be minimized.

The $D_{90}$ of the negative electrode active material may be 11 μm to 17 μm, preferably 13 μm to 16 μm, more preferably 14 μm to 15 μm. The $D_{10}$ of the negative electrode active material may be 5 μm to 9 μm, preferably 6 μm to 8 μm, more preferably 6.5 μm to 7.5 μm.

The BET specific surface area of the negative electrode active material is 2.2 $m^2/g$ or less. In general, natural graphite has a large specific surface area due to the presence of pores on the surface and inside thereof, and accordingly, has a problem in that a cycle expansion problem caused by an electrolyte solution side reaction intensifies. However, the negative electrode active material of the present invention adjusts a BET specific surface area range to the above-described level despite the use of natural graphite, and thus, may effectively prevent an electrolyte solution side reaction.

If the BET specific surface area of the negative electrode active material exceeds 2.20 $m^2/g$, an electrolyte solution side reaction intensifies, and an irreversible reaction of the negative electrode active material increases, thereby decreasing efficiency, so that the output and capacity properties of natural graphite may not be sufficiently implemented.

The BET specific surface area of the negative electrode active material may be 2.2 $m^2/g$ or less, preferably 1.5 $m^2/g$ to 2.2 $m^2/g$, more preferably 1.7 $m^2/g$ to 2.15 $m^2/g$. When in the above range, it is advantageous in terms of improving lifespan performance and high-temperature storage performance through preventing a swelling problem without deteriorating the output properties of natural graphite.

The BET specific surface area may be implemented by adjusting the $D_{50}$ of the negative electrode active material to be in the above-described range and processing natural graphite through a cold isostatic press (CIP) method to be described later. Typically, natural graphite has a relatively large BET specific surface area due to pores present on the surface and inside thereof, and accordingly, has a problem in that a side reaction with an electrolyte solution intensifies. However, in the present invention, the $D_{50}$ of a negative electrode active material may be controlled to be in the above range and the amount and area of pores may be effectively controlled by a CIP process, and thus, the BET specific surface area of the negative electrode active material is lowered to a desired level to prevent a side reaction with an electrolyte solution, thereby improving the lifespan properties of the negative electrode active material and preferably implementing the high output properties of natural graphite.

The BET specific surface area of the negative electrode active material may be measured by, for example, a Brunauer-Emmett-Teller (BET) measurement method using BELSORP (BET equipment) of BEL JAPAN using an adsorption gas such as nitrogen.

A $d_2/d_1$, which is a ratio of a pellet density $d_2$ at 3,000 kg to a pellet density $d_1$ at 400 kg of the negative electrode active material may be 1.1 or greater. When the $d_2/d_1$ is 1.1 or greater, active material particles may be smoothly packed during roll-pressing for the preparation of a negative electrode, so that it is preferable in terms of implementing a negative electrode having a high energy density. The pellet density may be measured by, for example, using a powder resistance measuring device (Product name: HPRM-1000, Manufacturer: HANTECH CO.).

<Method for Preparing Negative Electrode Active Material>

In addition, the present invention provides a method for preparing a negative electrode active material. Specifically, the method for preparing a negative electrode active material may be the above-described method for preparing a negative electrode active material.

Specifically, the method for preparing a negative electrode active material of the present invention includes the steps of pressurizing natural graphite by a Cold Isostatic Press (CIP) method, and adjusting the $D_{90}/D_{10}$ of the pressurized natural graphite, which is the ratio of $D_{90}$ to $D_{10}$, to be 2.20 or less and adjusting the $D_{50}$ of the pressurized natural graphite to be 6 μm to 11 μm, wherein the BET specific surface area of the natural graphite having the adjusted $D_{90}/D_{10}$ and $D_{50}$ is 2.2 $m^2/g$ or less.

The natural graphite may be spherical. The spherical natural graphite may be prepared by spheronizing flaky natural graphite, and when natural graphite is spherical, packing between active material particles may be facilitated, so that the thickness expansion problem of a negative electrode active material caused by charge/discharge may be reduced to an even more excellent level.

The flaky natural graphite is prepared from a natural graphite raw material (for example, collected from graphite ore), and specifically, may be prepared through processes such as pulverizing natural graphite raw material, removing impurities by base treatment and/or acid treatment, washing, drying, and sieving.

Spherical natural graphite may be prepared through the spheronization of the flaky natural graphite. Specifically, the spheronization may be performed using a vortex flow pulverizer.

The method for preparing a negative electrode active material of the present invention includes a step of pressurizing natural graphite by a cold isostatic press method. By the cold isostatic press method, fine pores present in the negative electrode active material including natural graphite may be effectively removed or reduced, and the specific surface area of the natural graphite may be reduced to an appropriate level, so that a cycle expansion problem of a negative electrode active material prepared therefrom, the problem due to an electrolyte solution side reaction, may be effectively prevented.

The "cold isostatic press" method or CIP refers to a molding method in which a powder is filled in a mold and the powder is compressed in an infinite multi-axis direction by hydrostatic pressure. That is, according to a CIP process, a power may be compressed in an isostatic manner, so that fine pores present in a molded negative electrode active material may be uniformly removed or reduced. The natural graphite pressurized by the CIP has a decreased reaction area with an electrolyte due to the reduction in fine pores. Thus, a side reaction with the electrolyte may be significantly reduced and the lifespan properties of a battery may be improved.

The pressurization may be performed at a pressure ranging from 80 MPa to 150 MPa, preferably 85 MPa to 135 MPa. When in the above pressure range, it is preferable in that pores of particles may be filled to a required level, so that a side reaction with the electrolyte may be effectively prevented, and damage to the negative electrode active material which may be caused by using excessively high pressure may be prevented.

The pressurization may be performed for 0.5 minutes to 30 minutes, preferably 1 minute to 10 minutes. When in the above range, it is preferable in that the BET specific surface area of the negative electrode active material may be reduced to a required level.

The method for preparing a negative electrode active material of the present invention may further include a step of forming a carbon coating layer on the natural graphite after pressurizing the natural graphite. The carbon coating layer may compensate for damage or cracks of natural graphite which may occur during pressurization, pulverization, sieving, acid/base treatment processes, and the like of the natural graphite, reduce the BET specific surface area of the natural graphite increased due to the pulverization and the like, and improve the mechanical stability of the negative electrode active material.

The carbon coating layer may be formed by providing at least one precursor selected from the group consisting of pitch, rayon and polyacrylonitrile-based resins to spherical natural graphite and performing heat-treatment to thermally decompose the precursor. A heat-treatment process for forming the carbon coating layer may be performed in the temperature range of 1,100° C. to 1,500° C., in terms of forming a uniform carbon coating layer and preventing excessive formation of the carbon coating layer.

The weight of the carbon coating layer may be 2 wt % to 7 wt %, preferably 3 wt % to 6 wt %, more preferably 4.5 wt % to 5.5 wt % based on the weight of the negative electrode active material. When in the above range, lithium intercalation/de-intercalation inhibition due to excessive formation may be prevented while sufficiently improving an effect of preventing a side reaction with an electrolyte solution, and structural stability.

The method for preparing a negative electrode active material of the present invention includes a step of adjusting the $D_{90}/D_{10}$ of the pressurized natural graphite, which is the ratio of $D_{90}$ to $D_{10}$, to be 2.20 or less and adjusting the $D_{50}$ of the pressurized natural graphite to be 6 μm to 11 μm.

The negative electrode active material having the $D_{90}/D_{10}$ and $D_{50}$ adjusted to be in the above-described ranges has a uniform particle size distribution. Thus, when applied to a negative electrode, the packing degree between particles is excellent, and the cycle expansion problem caused by the charge/discharge of the negative electrode and the resulting increase in the thickness of the negative electrode may be effectively prevented.

The step of adjusting the particle diameter distribution of the pressurized natural graphite may be performed by, for example, sieving, which is a well-known method in the art for adjusting a particle diameter distribution of particles.

When forming a carbon coating layer on the pressurized natural graphite, the step of adjusting a particle diameter distribution may be performed before forming the carbon coating layer or after forming the carbon coating layer.

The BET specific surface area of the carbon coating layer having the $D_{90}/D_{10}$ and $D_{50}$ adjusted may be 2.2 m²/g or less, preferably 1.5 m²/g to 2.2 m²/g, more preferably 1.7 m²/g to 2.15 m²/g. When in the above range, fine pores present in natural graphite are controlled to a required level, so that a side reaction with an electrolyte solution may be effectively prevented.

The above BET specific surface area range may be implemented by, for example, pressurizing the natural graphite by the above-described cold isostatic press method, or adjusting processing conditions of the cold isostatic press.

<Negative Electrode>

In addition, the present invention provides a negative electrode including the negative electrode active material described above.

Specifically, the negative electrode of the present invention includes a negative electrode current collector, a negative electrode active material layer formed on the negative electrode current collector, wherein the negative electrode active material layer includes the negative electrode active material described above.

The negative electrode current collector typically has a thickness of 3-500 μm. The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

The negative electrode active material layer includes the negative electrode active material described above.

The negative electrode active material layer may further include other active materials know in the art in the range that does not deteriorate the effect of the invention, specifically, one or two or more selected from the group consisting of a carbonaceous material, a metal such as a lithium-containing titanium composite oxide (LTO), Si, Sn, Li, Zn, Mg, Cd, Ce, Ni or Fe, an alloy composed of the metal, an oxide of the metal, and a composite of the metal and carbon.

The negative electrode conductive material may be included in the negative electrode active material layer in an amount of 80 wt % to 99 wt %, preferably 80 wt % to 99 wt %.

In addition, the negative electrode active material layer may further selectively include at least one additive selected from the group consisting of a binder, a thickener, and a conductive material, together with the negative electrode active material.

The binder is a component for assisting in bonding between a conductive material, an active material, and a current collector, and is typically added in an amount of 1 wt % to 30 wt % in a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

As the thickener, any thickener used in a typical lithium secondary battery may be used, and one example is carboxymethyl cellulose (CMC).

The conductive material is a component for further improving the conductivity of a negative electrode active material, and may be added in an amount of 1-20 wt % in a negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; fluorocarbon; metal powder such as aluminum powder, and nickel powder; a conductive whisker such as zinc oxide and potassium titanate; a conductive metal oxide such as titanium oxide; or a conductive material such as a polyphenylene derivative, and the like may be used. Specific examples of a commercially available conductive material may include acetylene black series of Chevron Chemical Company, Denka Black of Denka Singapore Private Limited, products of Gulf Oil Company, etc., Ketjen black, EC series of Armak Company, Vulcan XC-72 of Cabot Company, and Super P of Timcal Company.

Secondary Battery

In addition, the present invention provides a lithium secondary battery including the above-described negative electrode for a secondary battery.

Specifically, the lithium secondary battery includes the negative electrode described above, a positive electrode opposing the negative electrode, a separator interposed between the negative electrode and the positive electrode, and an electrolyte.

The positive electrode may include a positive electrode current collector, and a positive electrode active material layer formed on the positive electrode current collector.

The positive electrode active material layer may include a positive electrode active material, and selectively a binder and a conductive material.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode current collector may typically have a thickness of 3 μm to 500 μm.

The positive electrode active material layer is formed on the positive electrode current collector and includes a positive electrode active material.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (wherein $0<Y<1$), $LiMn_{2-Z}Ni_ZO_4$ (wherein $0<Z<2$), etc.), a lithium-nickel-cobalt-based oxide (e.g., $LiNi_{1-Y1}Co_{Y1}O_2$ (wherein $0<Y1<1$), etc.), a lithium-manganese-cobalt-based oxide (e.g., $LiCo_{1-Y2}Mn_{Y2}O_2$ (wherein $0<Y2<1$), $LiMn_{2-z1}Co_{z1}O_4$ (wherein $0<Z1<2$), etc.), a lithium-nickel-manganese-cobalt-based oxide (e.g., $Li(Ni_pCo_qMn_{r1})O_2$ (wherein $0<p<1$, $0<q<1$, $0<r1<1$, $p+q+r1=1$) or $Li(Ni_{p1}Co_{q1}Mn_{r2})O_4$ (wherein $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}A_{s2})O_2$ (wherein M is selected from the group consisting of Al, Fe, V, Cr, Ti, Ta, Mg, and Mo, and p2, q2, r3, and s2 are each an atomic fraction of stand-alone elements, wherein $0<p2<1$, $0<q2<1$, $0<r3<1$, $0<s2<1$, $p2+q2+r3+s2=1$, etc.) and the like, and any one thereof or a compound of two or more thereof may be included. Among these, due to the fact that the capacity properties and stability of a battery may be increased, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickel cobalt aluminum oxide (e.g., $Li(Ni_{0.8}Co_{0.15}Al_{0.05})O_2$, etc.), and the like.

The positive electrode active material may be included in an amount of 80 wt % to 99 wt % based on the total weight of a positive electrode active material layer.

The positive electrode active material layer may further selectively include at least one additive selected from the group consisting of a binder and a conductive material, together with the positive electrode active material described above.

The binder is a component for assisting in bonding of an active material, a conductive material, and the like, and in bonding to a current collector, and is typically added in an amount of 1 wt % to 30 wt % based on the total weight of a positive electrode active material layer. Examples of the binder may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, fluorine rubber, various copolymers thereof, and the like.

The conductive material is not particularly limited as long as it has conductivity without causing a chemical change in a battery. Examples of the conductive material may include graphite; a carbon-based material such as carbon black, acetylene black, Ketjen black, channel black, furnace black, lamp black, and thermal black; a conductive fiber such as carbon fiber and metal fiber; fluorocarbon; metal powder such as aluminum powder, and nickel powder; a conductive whisker such as zinc oxide and potassium titanate; a conductive metal oxide such as titanium oxide; or a conductive material such as a polyphenylene derivative, and the like. Specific examples of a commercially available conductive material may include acetylene black series of Chevron Chemical Company, Denka Black of Denka Singapore Private Limited, products of Gulf Oil Company, etc., Ketjen black, EC series of Armak Company, Vulcan XC-72 of Cabot Company, and Super P of Timcal Company.

The conductive material may be included in an amount of 1 wt % to 30 wt % based on the total weight of a positive electrode active material layer.

The positive electrode active material layer may be prepared by adding an additive including a positive electrode active material and selectively, a binder and/or a conductive material to a solvent to prepare a positive electrode slurry, and then applying the slurry on the positive electrode current collector, followed by roll-pressing and drying.

The solvent may include an organic solvent such as N-methyl-2-pyrrolidone (NMP), and may be used in an amount such that a preferred viscosity is achieved when the positive electrode active material and selectively, a binder and a conductive material, and the like are included. For example, the solvent may be included in an amount such that the concentration of a solid including the positive electrode active material and selectively a binder and a conductive material is 50 wt % to 95 wt %, preferably 70 wt % to 90 wt %.

In the lithium secondary battery, a separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond, an aromatic ring or ether bond); amides such as dimethylformamide; dioxolanes such as 1,3-dioxolane; or sulfolanes may be used. Among the above solvents, a carbonate-based solvent is preferable, and a mixture of a cyclic carbonate (e.g., ethylene carbonate or propylene carbonate) having a high ionic conductivity and a high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

As described above, the secondary battery according to the present invention is useful for portable devices such as a mobile phone, a notebook computer, and a digital camera, and in the field of electric vehicles such as a hybrid electric vehicle (HEV), and in particular, may be preferably used as a component battery for a medium-to-large-sized battery module. Therefore, the present invention also provides a medium-to-large-sized battery module including the secondary battery as described above as a unit cell.

A medium-to-large-sized battery module as described above may be preferably applied to a power source which requires high output and large capacity, such as an electric vehicle, a hybrid electric vehicle, and a power storage device.

Hereinafter, Examples of the present invention will be described in detail so that those skilled in the art may easily carry out the present invention. However, the present invention may be embodied in many different forms, and is not limited to Examples set forth herein.

EXAMPLES AND COMPARATIVE EXAMPLES

Example 1: Preparation of Negative Electrode Active Material

<Preparation of Natural Graphite>

A natural graphite raw material was collected from graphite ore using flotation, and the natural graphite raw material was treated with acid or base to remove impurities, and then washed and dried to prepare flaky natural graphite. The flaky natural graphite obtained above was spheronized using a vortex flow pulverizer, treated with sulfuric acid to remove impurities therefrom, and then dried at 500° C. to prepare spherical natural graphite.

The spherical natural graphite was filled into a mold and pressurized through a cold isostatic press (CIP) method. During the pressurization, the pressurization pressure was 90 MPa, and pressurization was performed for 100 seconds.

The pressurized spherical natural graphite and a pitch having a softening point of 130° C. was mixed, and the mixture was heat-treated in an inert atmosphere at 1,250° C. for 24 hours in a dry manner to form a carbon coating layer on the spherical natural graphite.

The spherical natural graphite on which the carbon coating layer is formed was crushed, sieved, and subjected to metal impurities removal (de-ironed), and the 10% volume cumulative diameter $D_{10}$, 50% volume cumulative diameter $D_{50}$, and 90% volume cumulative diameter $D_{90}$ thereof in a particle size distribution was adjusted to be 6.3 μm, 9 μm, and 13.5 μm, respectively to prepare a negative electrode active material of Example 1.

At this time, the carbon coating layer was formed to be 5 wt % based on the total weight of the positive electrode active material of Example 1.

Example 2: Preparation of Negative Electrode Active Material

A negative electrode active material of Example 2 was prepared in the same manner as in Example 1, except that the $D_{10}$, $D_{50}$, and $D_{90}$ of the spherical natural graphite having a carbon coating layer formed thereon were adjusted to be 7.3 μm, 9.0 μm, and 14.3 μm, respectively, at the time of the sieving after the formation of the carbon coating layer in Example 1.

Comparative Example 1: Preparation of Negative Electrode Active Material

A negative electrode active material of Comparative Example 1 was prepared in the same manner as in Example 1, except that pressurization by the cold isostatic press (CIP) method was not performed on the spherical natural graphite, and the $D_{10}$, $D_{50}$, and $D_{90}$ of the spherical natural graphite having a carbon coating layer formed thereon were adjusted to be 7.0 μm, 12 μm, and 19.5 μm, respectively, at the time of the sieving after the formation of the carbon coating layer in Example 1.

Comparative Example 2: Preparation of Negative Electrode Active Material

A negative electrode active material of Comparative Example 2 was prepared in the same manner as in Example 1, except that the $D_{10}$, $D_{50}$, and $D_{90}$ of the spherical natural graphite having a carbon coating layer formed thereon were adjusted included in be 6.7 μm, 12 μm, and 18.5 μm, respectively, at the time of the sieving after the formation of the carbon coating layer, and the carbon coating layer was formed to be 4 wt % based on the total weight of the negative electrode active material in Example 1.

Comparative Example 3: Preparation of Negative Electrode Active Material

A negative electrode active material of Comparative Example 3 was prepared in the same manner as in Example 1, except that pressurization by the cold isostatic press (CIP) method was not performed on the spherical natural graphite, and the $D_{10}$, $D_{50}$, and $D_{90}$ of the spherical natural graphite having a carbon coating layer formed thereon were adjusted to be 6.3 μm, 9 μm, and 15.5 μm, respectively, at the time of the sieving after the formation of the carbon coating layer in Example 1.

Comparative Example 4: Preparation of Negative Electrode Active Material

A negative electrode active material of Comparative Example 4 was prepared in the same manner as in Example 1, except that the $D_{10}$, $D_{50}$, and $D_{90}$ of the spherical natural graphite having a carbon coating layer formed thereon were adjusted included in be 6.2 μm, 9 μm, and 14.0 μm, respectively, at the time of the sieving after the formation of the carbon coating layer in Example 1.

The $D_{50}$, $D_{10}$, $D_{90}$, and BET specific surface area of the negative electrode active material prepared in each of Examples 1 and 2 and Comparative Examples 1 to 4 were respectively measured, and the measurement results are shown in Table 1 below.

TABLE 1

| | CIP performance | $D_{50}$ (μm) | $D_{90}$ (μm) | $D_{10}$ (μm) | $D_{90}/D_{10}$ | BET specific surface area (m²/g) |
|---|---|---|---|---|---|---|
| Example 1 | ○ | 9 | 13.5 | 6.3 | 2.14 | 2.1 |
| Example 2 | ○ | 9 | 14.3 | 7.3 | 1.96 | 2.0 |
| Comparative Example 1 | X | 12 | 19.5 | 7.0 | 2.79 | 2.4 |
| Comparative Example 2 | ○ | 12 | 18.5 | 6.7 | 2.76 | 2.4 |
| Comparative Example 4 | X | 9 | 15.5 | 6.3 | 2.46 | 3.2 |
| Comparative Example 5 | ○ | 9 | 14.0 | 6.2 | 2.26 | 2.9 |

Experimental Example 1: Swelling Evaluation

<Manufacturing of Lithium Secondary Battery>

The negative electrode active material prepared in each of Examples 1 and 2 and Comparative Examples 1 to 4, Super C65 as a conductive material, styrene butadiene rubber (SBR) as a binder, and carboxymethyl cellulose (CMC) as a thickener were mixed in a weight ratio of 95.9:1:1.9:1.2, and then added with water to prepare a negative electrode slurry. Thereafter, the negative electrode slurry was applied on a copper foil to a thickness of 65 μm, and then vacuum dried for 8 hours at about 130° C., followed by roll-pressing to manufacture a negative electrode. At this time, the negative electrode was manufactured to have a loading of 3.61 mAh/cm².

LiCoO$_2$ as a positive electrode active material, Li-435 of Denka Company as a conductive material, KF9700 of Kureha Company as a binder, and BH-730H of Zeon Company as a thickener were mixed in a weight ratio of 96.25:1.0:1.5:1.25, and then added with water to prepare a positive electrode slurry, and the positive electrode slurry was applied on an aluminum foil, and then vacuum dried for 8 hours at about 130° C., followed by roll-pressing to manufacture a positive electrode. At this time, the positive electrode was manufactured to have a loading of 3.61 mAh/cm$^2$.

A polyolefin separator was interposed between the negative electrode manufactured in each of Examples 1 and 2 and Comparative Examples 1 to 4 and the positive electrode, and then an electrolyte solution was injected thereto to manufacture a secondary battery of each of Examples and Comparative Examples. The electrolyte solution used was prepared by adding vinylene carbonate (VC) to a non-aqueous electrolyte solvent in an amount of 0.5 wt % based on the solvent, the solvent in which ethylene carbonate (EC) and ethyl methyl carbonate (EMC) are mixed in a volume ratio of 1:4, and then dissolving 1 M of LiPF$_6$ therein.

<Swelling Evaluation>

The lithium secondary battery manufactured in each of Examples 1 and 2 and Comparative Examples 1 to 4 was charged and discharged at 0.1 C for the first cycle, 0.2 C for the second cycle, and 0.5 C from the third cycle to the 30$^{th}$ cycle by having a charging range of SOC 0 to SOC 95. Thereafter, a swelling ratio was calculated by Equation 1 below.

$$\text{Swelling ratio }(\%) = \{(t_2 - t_1)/t_1\} \times 100 \quad \text{[Equation 1]}$$

(t1 is the thickness of a negative electrode for a secondary battery before the first charge/discharge cycle, t2 is the thickness of a negative electrode for a secondary battery after the 30$^{th}$ charge/discharge cycle)

TABLE 2

|  | Swelling ratio (%) |
| --- | --- |
| Example 1 | 22 |
| Example 2 | 21 |
| Comparative Example 1 | 27 |
| Comparative Example 2 | 25 |
| Comparative Example 3 | 26 |
| Comparative Example 4 | 24 |

Referring to Table 2, the negative electrode active material of each of Examples 1 and 2 in which natural graphite was pressurized by the cold isostatic press method and the D50 and D90/D10 of the negative electrode active material were adjusted to a desired range, was prevented from being subjected to an electrolyte solution side reaction and had a swelling phenomenon reduced to an excellent level when compared to Comparative Examples.

The invention claimed is:

1. A negative electrode active material, comprising:
   natural graphite,
   wherein a $D_{90}/D_{10}$, which is the ratio of $D_{90}$ to $D_{10}$, is 2.20 or less;
   wherein a $D_{50}$ is 6 μm to 11 μm; and
   wherein a BET specific surface area is 2.2 m$^2$/g or less.

2. The negative electrode active material of claim 1, wherein the $D_{90}/D_{10}$, which is the ratio of $D_{90}$ to $D_{10}$, is 1.98 or less.

3. The negative electrode active material of claim 1, further comprising: a carbon coating layer formed on the natural graphite.

4. The negative electrode active material of claim 3, wherein the carbon coating layer is present in the negative electrode active material layer in an amount of 2 wt % to 7 wt %.

5. The negative electrode active material of claim 1, wherein the negative electrode active material is spherical.

6. A method for preparing a negative electrode active material, the method comprising steps of:
   pressurizing natural graphite by a cold isostatic press method; and
   adjusting the $D_{90}/D_{10}$ of the pressurized natural graphite, which is the ratio of $D_{90}$ to $D_{10}$, to be 2.20 or less and adjusting the $D_{50}$ of the pressurized natural graphite to be 6 μm to 11 μm,
   wherein the BET specific surface area of the natural graphite having the adjusted $D_{90}/D_{10}$ and $D_{50}$ is 2.2 m$^2$/g or less.

7. The method of claim 6, wherein the natural graphite is spherical.

8. The method of claim 6, further comprising: forming a carbon coating layer on the natural graphite after pressurizing the natural graphite.

9. The method of claim 8, wherein a weight of the carbon coating layer is 2 wt % to 7 wt % based on a weight of the negative electrode active material.

10. The method of claim 6, wherein the pressurization is performed at a pressure ranging from 80 MPa to 150 MPa.

11. The method of claim 6, wherein the pressurization is performed for 0.5 minutes to 30 minutes.

12. A negative electrode comprising:
   a negative electrode current collector; and
   a negative electrode active material layer formed on the negative electrode current collector,
   wherein the negative electrode active material layer comprises the negative electrode active material according to claim 1.

13. A secondary battery comprising:
   a negative electrode according to claim 12;
   a positive electrode opposing the negative electrode;
   a separator interposed between the positive electrode and the negative electrode; and
   an electrolyte.

* * * * *